United States Patent
Kwon et al.

(10) Patent No.: US 9,123,180 B2
(45) Date of Patent: Sep. 1, 2015

(54) METHOD, SYSTEM AND COMPUTER-READABLE RECORDING MEDIUM FOR DISPLAYING SHADOW OF 3D VIRTUAL OBJECT

(71) Applicant: Center Of Human-Centered Interaction For Coexistence, Seoul (KR)

(72) Inventors: Joung Huem Kwon, Seoul (KR); Romain Destenay, Seoul (KR); Jai Hi Cho, Seoul (KR); Bum Jae You, Seoul (KR)

(73) Assignee: Center Of Human-Centered Interaction For Coexistence, Seoul (KR)

( * ) Notice: Subject to any disclaimer, the term of this patent is extended or adjusted under 35 U.S.C. 154(b) by 29 days.

(21) Appl. No.: 14/252,837

(22) Filed: Apr. 15, 2014

(65) Prior Publication Data

US 2014/0375639 A1    Dec. 25, 2014

(30) Foreign Application Priority Data

Jun. 21, 2013    (KR) .......................... 10-2013-0071463

(51) Int. Cl.
- *G06T 15/00* (2011.01)
- *G06T 15/60* (2006.01)
- *G06T 15/50* (2011.01)

(52) U.S. Cl.
CPC .................. *G06T 15/60* (2013.01); *G06T 15/50* (2013.01)

(58) Field of Classification Search
CPC ............ A63F 13/10; A63F 2300/1012; A63F 2300/1087; A63F 2300/6615
USPC ......................................................... 345/419
See application file for complete search history.

(56) References Cited

U.S. PATENT DOCUMENTS

| | | | | |
|---|---|---|---|---|
| 2005/0190181 | A1* | 9/2005 | Sakagawa et al. ............ | 345/419 |
| 2009/0009515 | A1* | 1/2009 | Tanaka ........................ | 345/426 |
| 2009/0077504 | A1* | 3/2009 | Bell et al. ...................... | 715/863 |

FOREIGN PATENT DOCUMENTS

| | | |
|---|---|---|
| JP | 11316853 A | 11/1999 |
| KR | 1020080080643 | 9/2008 |

* cited by examiner

*Primary Examiner* — Peter Hoang
(74) *Attorney, Agent, or Firm* — Husch Blackwell LLP

(57) ABSTRACT

A method for displaying a shadow of a 3D virtual object, includes steps of: (a) acquiring information on a viewpoint of a user looking at a 3D virtual object displayed in a specific location in 3D space by a wall display device; (b) determining a location and a shape of a shadow of the 3D virtual object to be displayed by referring to information on the viewpoint of the user and the information on a shape of the 3D virtual object; and (c) allowing the shadow of the 3D virtual object to be displayed by at least one of the wall display device and a floor display device by referring to the determined location and the determined shape of the shadow of the 3D virtual object. Accordingly, the user is allowed to feel the accurate sense of depth or distance regarding the 3D virtual object.

13 Claims, 8 Drawing Sheets

METHOD, SYSTEM AND COMPUTER-READABLE RECORDING MEDIUM FOR DISPLAYING SHADOW OF 3D VIRTUAL OBJECT

CROSS REFERENCE TO RELATED APPLICATION

This application claims priority to and incorporates herein by reference all disclosure in Korean Patent Application No. 10-2013-0071463 filed Jun. 21, 2013.

FIELD OF THE INVENTION

The present invention relates to a method, a system, and a computer-readable medium for displaying a shadow of a 3D virtual object; and more particularly, to the method, the system, and the computer-readable medium for acquiring information on a viewpoint of a user watching a 3D virtual object displayed at a specific location on 3D space by a wall display device, deciding a location where a shadow of the 3D virtual object will be displayed, and a shape made by the shadow by referring to the information on the user's viewpoint and information on the shape of the 3D virtual object, allowing the shadow of the 3D virtual object to be displayed by at least one of the wall display device and a floor display device interlocked therewith by referring to the location and the shape of the shadow, displaying a shadow generable on assumption that a light source is located on the upper part of the 3D virtual object in a vertical direction of a display surface of the floor display device, and then allowing the user to feel an accurate sense of depth or distance for the 3D virtual object.

BACKGROUND OF THE INVENTION

Recently, three dimensional image display devices have been popularized and accordingly, numerous attempts have been made at watching virtual objects through such devices. In particular, a technology that allows a user to directly manipulate and touch a virtual object outputted (i.e., displayed) through a 3D image display device is more requested. To implement such a technology, the user must recognize at which location in actual place the virtual object is placed.

Because a sense of depth, i.e., a feeling of a user regarding to what degree the virtual object is projected to actual space or move into the display surface based on a display surface of the 3D image display device, or a sense of distance that the user feels about the virtual object displayed through the 3D image display device depends on a cognitive ability of an individual user, there is a limit that each user cannot but feel the sense of depth or distance differently.

In addition, it has a limit that all users are provided with the same sense of depth or distance only when the user himself or herself must conduct manual pre-calibrated work because 3D images are created by using optical illusion due to the difference between the views of left and right eyes of the user.

SUMMARY OF THE INVENTION

It is an object of the present invention to solve all the problems mentioned above.

It is further an object of the present invention to provide a method, a system, and a computer-recordable medium for acquiring information on a viewpoint of a user watching a 3D virtual object displayed at a specific location on 3D space by a wall display device, deciding a location where a shadow of the 3D virtual object will be displayed and a shape made by the shadow by referring to the information on the user's viewpoint and information on the shape of the 3D virtual object, and allowing the shadow of the 3D virtual object to be displayed by at least one of the wall display device and a floor display device interlocked therewith by referring to the location and the shape of the shadow.

In accordance with one aspect of the present invention, there is provided a method for displaying a shadow of a 3D virtual object, including steps of: (a) acquiring information on a viewpoint of a user looking at a 3D virtual object displayed in a specific location in 3D space by a wall display device; (b) determining a location and a shape of a shadow of the 3D virtual object to be displayed by referring to information on the viewpoint of the user and the information on a shape of the 3D virtual object; and (c) allowing the shadow of the 3D virtual object to be displayed by at least one of the wall display device and a floor display device which corresponds to the wall display device by referring to the determined location and the determined shape of the shadow of the 3D virtual object.

In accordance with another aspect of the present invention, there is provided a system for displaying a shadow of a 3D virtual object, including; a user viewpoint information acquiring part for acquiring information on a viewpoint of a user looking at the 3D virtual object displayed in a specific location in 3D space by a wall display device; a shadow location and shape determining part for determining a location and a shape of the shadow of the 3D virtual object to be displayed by referring to the information on the viewpoint of the user and the information on a shape of the 3D virtual object; and a shadow displaying part for allowing the shadow of the 3D virtual object to be displayed by at least one of the wall display device and a floor display device which corresponds to the wall display device by referring to the determined location and the determined shape of the shadow of the 3D virtual object to be displayed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
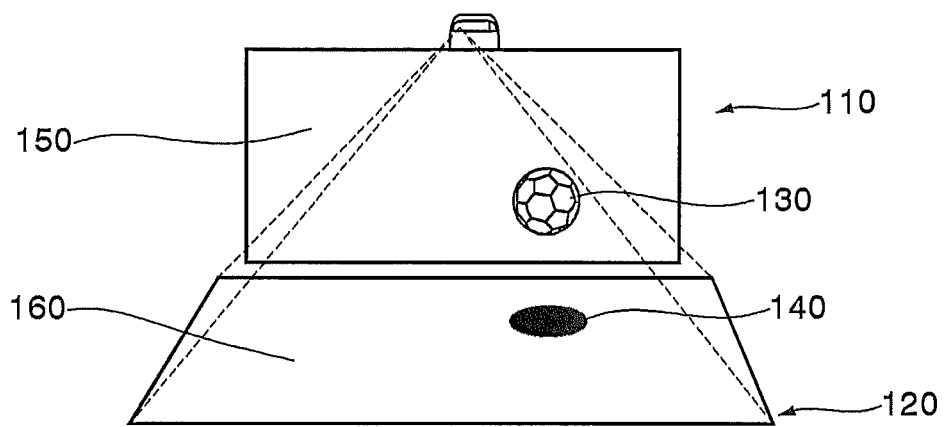
FIG. 1 is a drawing illustrating a sketchy configuration of a whole system for displaying a shadow of a 3D virtual object in accordance with an example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of Whole System

FIG. 1 illustrates a sketchy configuration of a whole system for displaying a shadow of a 3D virtual object in accordance with an example embodiment of the present invention.

As illustrated in FIG. 1, the whole system in accordance with one example embodiment of the present invention may include a wall display device 110, a floor display device 120, and a 3D display system 200 (not illustrated in FIG. 1).

First of all, the wall display device 110 in accordance with one example embodiment of the present invention may perform a function of displaying a 3D virtual object 130 shown as if the 3D virtual object would exist at a specific location in actual space where the user exists. In addition, the wall display device 110 in accordance with one example embodiment of the present invention may perform a function of displaying a part of the shadow of the 3D virtual object decided to be located far from the user through its display surface 150. For example, the wall display device 110 in accordance with one example embodiment of the present invention may include a liquid crystal display (LCD), an organic light-emitting diode (OLED), a plasma display (PDP) or a similar flat panel display.

Next, the floor display device 120 in accordance with one example embodiment of the present invention may perform a function of displaying the shadow 140 of the 3D virtual object on its display surface 160 on the floor in the actual space where the user exists by referring to the location and the shape of the shadow 140 of the 3D virtual object determined by the 3D display system 200 as explained below. More specifically, the floor display device 120 in accordance with one example embodiment of the present invention may perform a function of displaying a part of the shadow of the 3D virtual object determined to be located close to the user through the display surface 160. For example, the floor display device 120 in accordance with one example embodiment of the present invention may include a projection display device such as a beam projector.

The 3D display system 200 in accordance with one example embodiment of the present invention may perform a function of acquiring information on a viewpoint of a user watching the 3D virtual object 130 displayed at a specific location on 3D space by the wall display device 110, deciding a location where the shadow 140 of the 3D virtual object will be displayed and a shape made by the shadow by referring to the information on the user's viewpoint and information on the shape of the 3D virtual object, and allowing the shadow 140 of the 3D virtual object to be displayed by at least one of the wall display device 110 and the floor display device 120 interlocked therewith by referring to the location and the shape of the shadow 140. The detailed explanation on the internal configuration and each component of the 3D display system 200 will be made below.

Configuration of Object Information Providing System

To implement the present invention, the internal configuration of the 3D display system 200 that performs important functions will be explained later.

Figure 2:
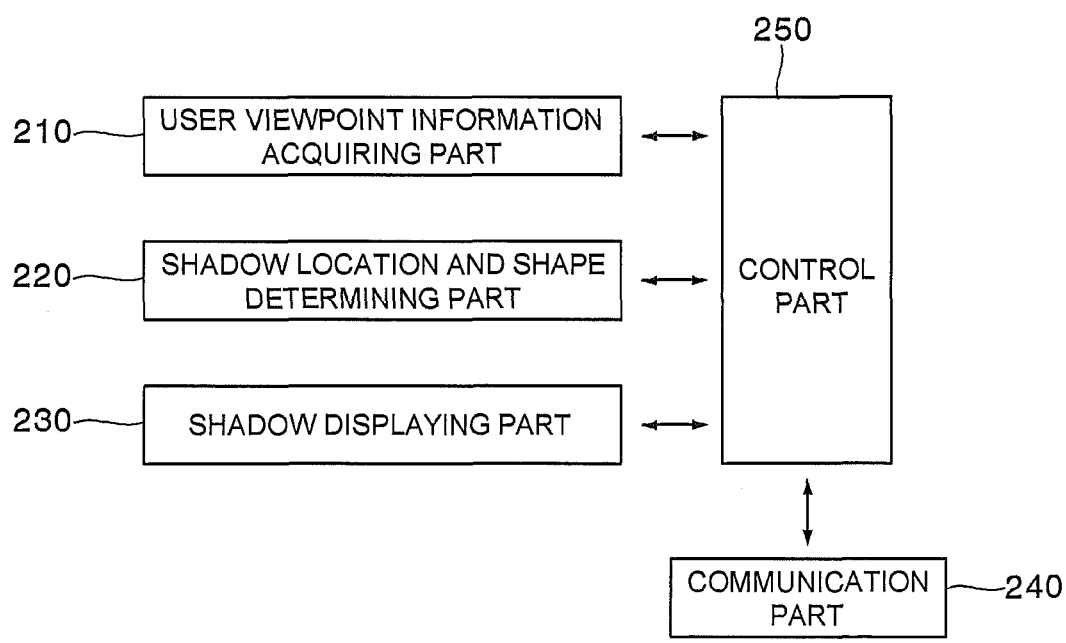
FIG. 2 is a diagram exemplarily showing an internal configuration of a 3D display system in accordance with an example embodiment of the present invention.

In particular, FIG. 2 is a drawing exemplarily presenting the internal configuration of the 3D display system 200 in accordance with one example embodiment of the present invention.

By referring to FIG. 2, the 3D display system 200 in accordance with one example embodiment of the present invention may include a user viewpoint information acquiring part 210, a shadow location and shape determining part 220, a shadow displaying part 230, a communication part 240, and a control part 250. In accordance with one example embodiment of the present invention, at least some of the user viewpoint information acquiring part 210, the shadow location and shape determining part 220, the shadow displaying part 230, the communication part 240, and the control part 250 may be program modules communicating with the wall display device 110 or the floor display device 120. Such program modules may be included in the 3D display system 200 in a form of an operating system, an application program module, and other program modules or physically stored in various storage devices well known to those skilled in the art. In addition, they may be stored in a remote storage device capable of communicating with the 3D display system 200. The program modules may include but not be subject to a routine, a subroutine, a program, an object, a component, and a data structure for executing a specific operation or a type of specific abstract data that will be described in accordance with the present invention.

First, the user viewpoint information acquiring part 210 in accordance with one example embodiment of the present invention may perform a function of acquiring information on the viewpoint of the user seeing the 3D virtual object as if it would exist at a specific location in actual 3D space by the wall display device 110. Because the location and the shape of the shadow 140 of the 3D virtual object 130 to be displayed may be different depending on at which location in actual space the user see the 3D virtual object 130, the information on the location and the direction of the viewpoint of the user looking at the 3D virtual object is required to display its shadow 140 accurately and realistically.

In accordance with one example embodiment of the present invention, the location and the direction of the viewpoint of the user can be specified by the location and the direction of a screen camera corresponding to the viewpoint of the user. More specifically, the screen camera may be installed on a body part such as the head of the user to a line of sight of the user, and include a certain sensor for performing a function of detecting a location and a direction of the screen camera.

The shadow location and shape determining part 220 in accordance with one example embodiment of the present invention may perform a function of determining the location and the shape of the shadow of the 3D virtual object by referring to the information on the direction of the viewpoint of the user acquired from the user viewpoint information acquiring part 210 and the information on the shape of the 3D virtual object.

The shadow 140 of the 3D virtual object indicates a shadow to be created by a source of light on assumption that the source of light is located on the upper side of the 3D virtual object 130 to the direction vertical to the display surface of the floor display device 120. It may perform a role as a sign for showing the location of the 3D virtual object in actual space where the user exists. Accordingly, the user may feel the sense of depth or distance of the 3D virtual object 130 accurately based on its shadow 140 displayed in accordance with the present invention.

The shadow location and shape determining part 220 in accordance with one example embodiment of the present invention may determine the location and the shape of the shadow of the 3D virtual object by calculating a location and a rotation of a virtual camera, i.e., a floor camera, in a preset conformity with the screen camera that specifies the viewpoint of the user as explained above. More specifically, the shadow location and shape determining part 220 in accordance with one example embodiment of the present invention may calculate the location and the rotation of the virtual floor camera by referring to the conformity between the location and the rotation of the screen camera that specifies the location and the direction of the viewpoint of the user looking at the 3D virtual object and those of the virtual floor camera.

The calculated location and the calculated rotation of the virtual floor camera may specify the location and the shape of the shadow of the 3D virtual object. In other words, the location of the shadow of the 3D virtual object may be specified by the location and the direction of the virtual floor camera and the shape of the shadow of the 3D virtual object may be specified by a shape of a shadow created on assumption that light is flashed by the source of light existing on the upper side of the 3D virtual object to the vertical direction when the shape of the shadow of the 3D virtual object is rotated as much as the virtual floor camera is rotated.

Figure 3:
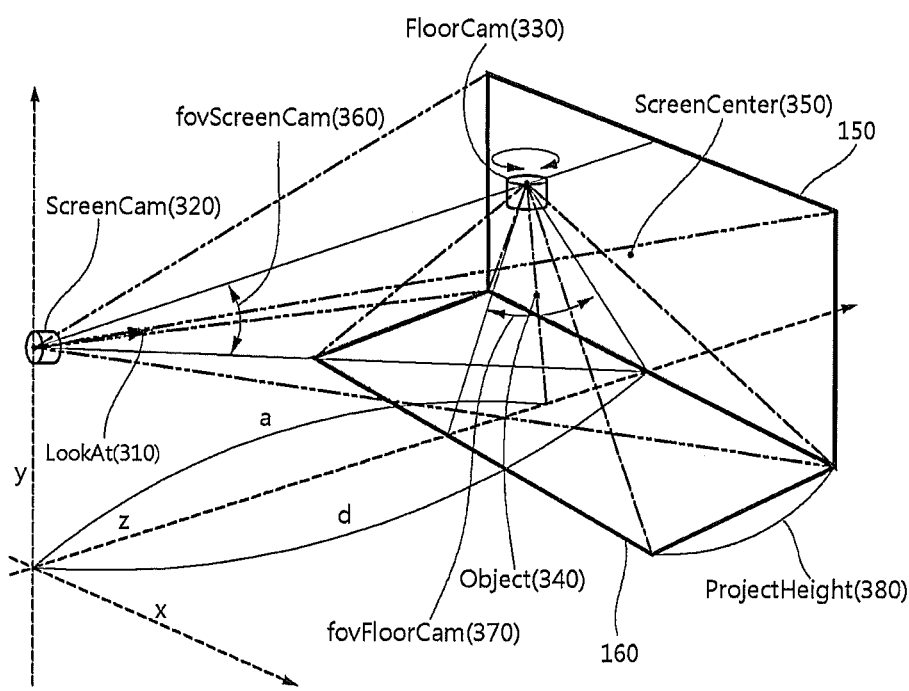
FIG. 3 is a drawing exemplarily presenting a relationship between a screen camera and a virtual floor camera in accordance with an example embodiment of the present invention.

FIG. 3 is a drawing exemplarily presenting a relationship between a screen camera and a virtual floor camera in accordance with an example embodiment of the present invention.

In FIG. 3, LookAt 310 indicates the line of sight of the user while ScreenCam 320 indicates the screen camera. FloorCam 330 points to the virtual floor camera; Object 340 refers to the location of the 3D virtual object while ScreenCenter 350 indicates the center of the display surface 150 of the wall display device, fovScreenCam 360 indicates the field of view of the screen camera, fovFloorCam 370 indicates the field of view of the virtual floor camera, and ProjectHeight 380 indicates the height of the display surface 160 of the floor display device. "a" points to the distance between the screen camera and the 3D virtual object while "d" indicates that between the screen camera and the display surface 150 of the wall display device.

By referring to FIG. 3, given the coordinate of the user's viewpoint (LookAt), i.e., that of the screen camera (ScreenCam), the location and the rotation of the virtual floor camera (FloorCam) may be calculated as shown in Math Formula 1 as shown below:

<Math Formula>

$$x\ floorCam = (x\ screenCenter - x\ screenCam)\frac{a}{d} + x\ screencam$$

$$yfloorCam = \frac{\frac{projectHeight}{2}}{\sin\left(\frac{fovFloorCam}{2}\right)}$$

$$z\ floorCam = (z\ screenCenter - z\ screenCam)\frac{a}{d} + z\ screencam$$

$$rotationfloorCam = \sin^{-1}\left(\frac{z\ screenCenter - z\ screenCam}{x\ screenCenter - x\ screenCam}\right)$$

$$a = d - \frac{projectHeight}{2}$$

$$d = \frac{y\ screencam}{\sin\left(\frac{fovScreenCam}{2}\right)}$$

$$x\ screenCenter = (x\ lookAt - x\ screenCam)d + x\ screencam$$

$$z\ screenCenter = (z\ lookAt - z\ screenCam)d + z\ screencam$$

More specifically, in the aforementioned math formula 1, x floorCam, y floorCam, z floorCam, and rotation floorCam indicate coordinates x, y, and z and rotation angle of a virtual floor camera 330, respectively; x ScreenCam, y ScreenCam, and z ScreenCam point to coordinates x, y, and z of the screen camera 320; x ScreenCenter, y ScreenCenter, and z ScreenCenter indicate coordinates x, y, and z of the center of the display surface 150 of the wall display device, respectively; projectHeight, fovFloorCam, and fovScreenCam point to the height of the display surface 160 of the floor display device, the field of view of the virtual floor camera 370, and the field of view 360 of the screen camera, respectively.

In accordance with one example embodiment of the present invention, the coordinates x and z of the virtual floor camera 330 may specify the location of the shadow of the 3D object 340 on the display surface 160 of the floor display device or the display surface 150 of the wall display device; the coordinate y of the virtual floor camera 330 may specify the size of the shadow of the 3D object 340 on the display surface 160 of the floor display device or the display surface 150 of the wall display device; and the rotation angle of the virtual floor camera 330 may specify the shape of the shadow of the 3D virtual object 340 on the display surface 160 of the floor display device or the display surface 150 of the wall display device.

In accordance with another example embodiment of the present invention, it may be assumed that a real light source with arbitrary strength exists at a random location in the 3D space, in which case, the shadow location and shape determining part 220 may determine a location and a shape of the shadow of the 3D virtual object by referring to information on the viewpoint of the user as well as information relating to the strength or the location of the real light source (by sensing the strength or the location of the real light source).

Besides, the shadow displaying part 230 in accordance with one example embodiment of the present invention may perform a function of allowing the shadow of the 3D virtual object to be displayed through at least one of the wall display device 110 and the floor display device 120 connected therewith by referring to the location and the shape of the shadow of the 3D virtual object determined by the shadow location and shape determining part 220.

More specifically, the shadow displaying part 230 in accordance with one example embodiment of the present invention may allow the part of the shadow of the 3D virtual object determined to be located close to the user to be displayed through the display surface 160 of the floor display device 120 by referring to the boundary line between the display surface 150 of the wall display device 110 and the display surface 160 of the floor display device 120. In addition, the shadow displaying part 230 in accordance with one example embodiment of the present invention may allow the part of the shadow of the 3D virtual object determined to be located far from the user to be displayed through the display surface 150 of the wall display device 110 by referring to the boundary line therebetween.

Figure 4A:
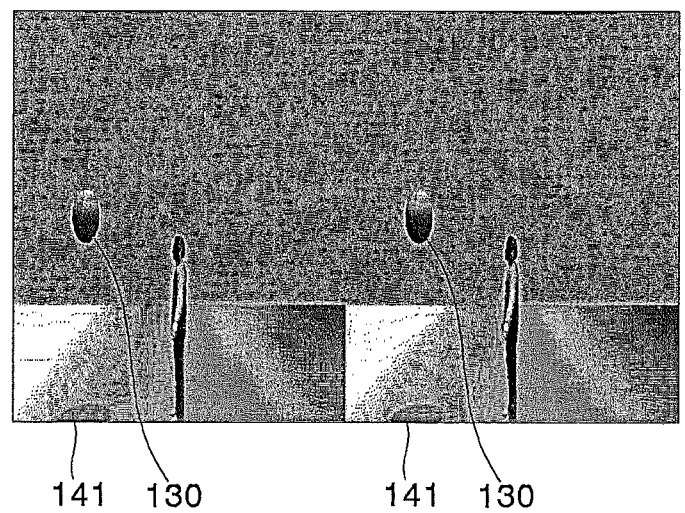
FIG. 4A is a diagram that exemplarily represents a screen where the 3D virtual object and its shadow are displayed in an example embodiment of the present invention.
Figure 4B:
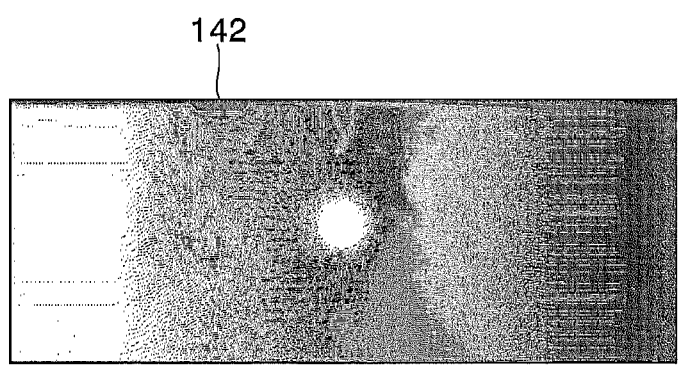
FIG. 4B is a diagram that exemplarily represents another screen where the 3D virtual object and its shadow are displayed in an example embodiment of the present invention.

In addition, FIG. 4 exemplarily represents a screen where the 3D virtual object and its shadow are displayed in an example embodiment of the present invention. For reference, FIG. 4(a) indicates the screen of the display surface 150 of the wall display device to be displayed, and FIG. 4(b) points to the screen displayed in the display surface 160 of the floor display device. In addition, as the left and right screens in (a) in FIG. 4 are synthesized and displayed, the 3D virtual object may have a 3D effect.

By referring to FIGS. 4(a) and 4(b), it may be assumed that a shadow 141 and 142 of the 3D virtual object 130 would be displayed over the boundary line of the display surface 150 of the wall display device 110 and the display surface 160 of the floor display device 120, in which case a part 141 of the shadow determined to be located near the user based on the boundary is displayed through the display surface 160 of the floor display device, and a part 142 of the shadow determined to be located far from the user based thereon is displayed through the display surface 150 of the wall display device 110.

The communication part 240 in accordance with one example embodiment of the present invention performs a function of allowing the 3D display system 200 to be communicable with an external device such as the wall display device 110 or the floor display device 120.

In accordance with one example embodiment of the present invention, the control part 250 performs a function of controlling data flow among the user viewpoint information acquiring part 210, the shadow location and shape determining part 220, the shadow displaying part 230, and the communication part 240. In other words, the control part 250 controls the flow of data from/to outside or between the component of the 3D display system 200, the user viewpoint information acquiring part 210, the shadow location and shape determining part 220, the shadow displaying part 230, and the communication part 240 to allow each part to perform its unique functions.

Experiment Result

Figure 5A:
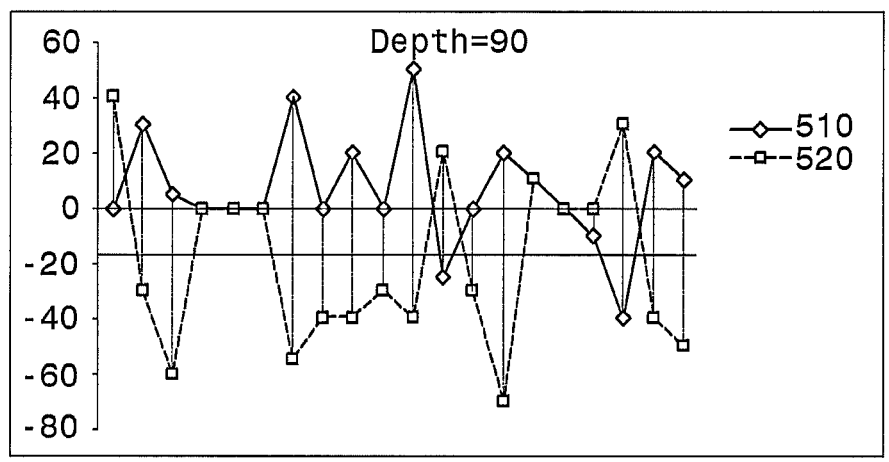
FIG. 5A is a drawing showing a result of performing an experiment on a sense of depth or distance felt by a user if the shadow of the 3D virtual object is displayed, in which the 3D virtual object was 90 cm away, in accordance with an example embodiment of the present invention.
Figure 5B:
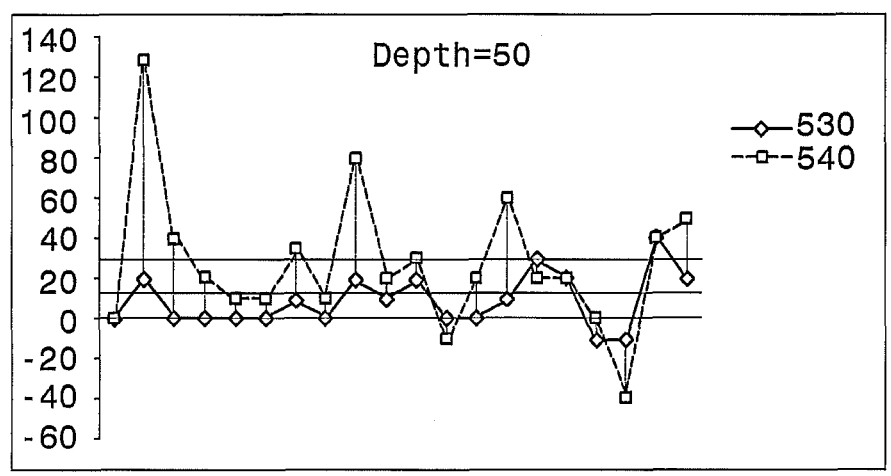
FIG. 5B is a drawing showing a result of performing an experiment on a sense of depth or distance felt by a user if the shadow of the 3D virtual object is displayed, in which the 3D virtual object was 50 cm away, in accordance with an example embodiment of the present invention.
Figure 5C:
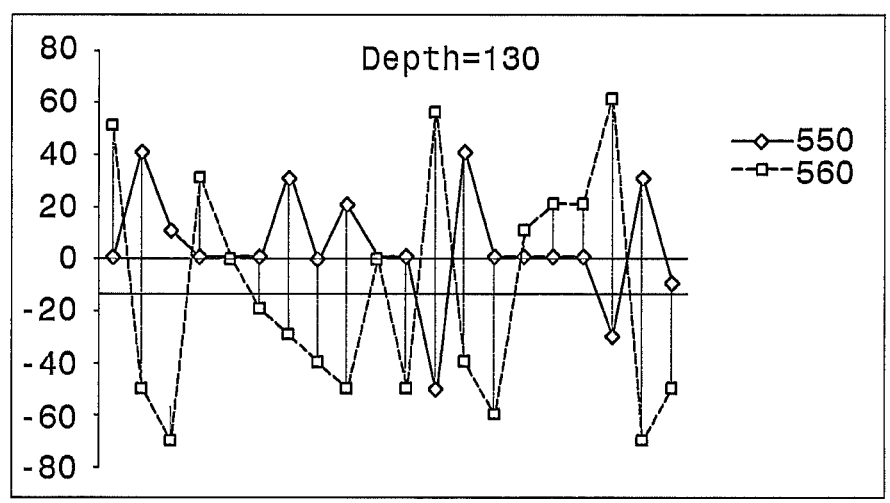
FIG. 5C is a drawing showing a result of performing an experiment on a sense of depth or distance felt by a user if the shadow of the 3D virtual object is displayed, in which the 3D virtual object was 130 cm away, in accordance with an example embodiment of the present invention.

FIGS. 5A-5C are drawings showing a result of performing an experiment on a sense of depth or distance felt by a user if the shadow of the 3D virtual object is displayed in accordance with an example embodiment of the present invention.

In the experiment in FIGS. 5A-5C, when 3D virtual objects which were 90 cm, 50 cm, and 130 cm far from participants were displayed, the 3D virtual objects with their shadows together in accordance with the present invention were displayed to a first group of 20 participants while only the 3D virtual objects without their shadows were displayed to the other second group of 20 participants. At the time, how far the 3D virtual objects are displayed to be located from the first and second groups of participants was asked based on the display surface.

By referring to FIG. 5A, when the 3D virtual object was displayed at the location 90 cm far from the display surface, i.e., Depth=90, while the first group of participants that saw the 3D virtual object with its shadow felt the 3D virtual object was on average 6.5 cm more far away from the display surface than the actual one and the standard deviation was 20.39, it appeared that the second group of participants that saw the 3D virtual object only without its shadow felt the 3D virtual object was on average 19.25 cm less far away and the standard deviation was 31.38. In short, it can be found out that the error and deviation of the sense of depth or distance felt by the first group of participants are apparently less than those of the second group of participants.

By referring to FIG. 5B, the 3D virtual object was displayed at the location 50 cm far from the display surface, i.e., Depth=50, while the first group felt the 3D virtual object was on average 14 cm more far away from the display surface than the actual one and the standard deviation was 14.14, it appeared that the second group felt the 3D virtual object was on average 27.25 cm less far away and the standard deviation was 35.45. In short, it can be found out that the error and deviation of the sense of depth or distance felt by the first group are apparently less than those of the second group.

By referring to in FIG. 5C, when the 3D virtual object was displayed at the location 130 cm far from the display surface, i.e., Depth=130, while the first group felt the 3D virtual object was on average 4 cm more far away from the display surface than the actual one and the standard deviation was 21.37, it appeared that the second group felt the 3D virtual object was on average 14.25 cm less far away and the standard deviation was 42.77. In other words, it can be found out that the error and deviation of the sense of depth or distance felt by the first group are apparently less than those of the second group.

As confirmed in the experiment result, the user can feel the accurate sense of depth or distance regarding the 3D virtual object.

Since the shadow of the 3D virtual object is displayed on assumption that a light source is located on the upper part of the 3D virtual object in a vertical direction of the display surface of the floor display device, the user is allowed to feel the accurate sense of depth or distance regarding the 3D virtual object.

The embodiments of the present invention as explained above can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As confirmed in the experiment result, according to the 3D display system in accordance with the present invention, the user can feel the accurate the sense of depth or distance regarding the 3D virtual object.

In accordance with the present invention, because the shadow of the 3D virtual object generable on assumption that light source is located on the upper side of the object to the direction vertical to the display surface of the floor display device, the effect is achieved that the user can feel the accurate the sense of depth or distance regarding the 3D virtual object based on its shadow.

What is claimed is:

1. A method for displaying a shadow of a 3D virtual object, comprising steps of:
   (a) acquiring information on a viewpoint of a user looking at a 3D virtual object displayed in a specific location in 3D space by a wall display device;
   (b) determining a location and a shape of a shadow of the 3D virtual object to be displayed by referring to information on the viewpoint of the user and the information on a shape of the 3D virtual object; and
   (c) allowing the shadow of the 3D virtual object to be displayed by at least one of the wall display device and a floor display device which corresponds to the wall display device by referring to the determined location and the determined shape of the shadow of the 3D virtual object,
   wherein, at the step (c), (1) if at least part of the shadow of the 3D virtual object is determined to be located near the user based on a boundary line between a display surface of the wall display device and a display surface of the floor display device, the at least part of the shadow of the 3D virtual object is allowed to be displayed through the floor display device, and (2) if at least part of the shadow of the 3D virtual object is determined to be located far from the user based on the boundary line therebetween, the at least part of the shadow of the 3D virtual object is allowed to be displayed through the wall display device.

2. The method of claim 1, wherein the shadow of the 3D virtual object includes a shadow generable on assumption that a light source is located on the upper side of the 3D virtual object to the direction vertical to a display surface of the floor display device.

3. The method of claim 1, wherein the wall display device includes a flat panel display device and the floor display device includes a projector display device.

4. The method of claim 1, wherein the information on the viewpoint of the user is specified by a location and a direction of a screen camera corresponding to the viewpoint of the user and the location and the shape of the shadow of the 3D virtual object to be displayed is realized by a location and a rotation of a virtual floor camera depending on the location and the direction of the screen camera.

5. The method of claim 4, wherein the screen camera is installed on the head of the user to the direction of the line of sight of the user.

6. The method of claim 1, the location and the shape of the shadow of the 3D virtual object to be displayed are determined by further referring to information on a strength or a location of a real light source in the 3D space.

7. A method for displaying a shadow of a 3D virtual object, comprising steps of:
   (a) acquiring information on a viewpoint of a user looking at a 3D virtual object displayed in a specific location in 3D space by a wall display device;
   (b) determining a location and a shape of a shadow of the 3D virtual object to be displayed by referring to information on the viewpoint of the user and the information on a shape of the 3D virtual object; and
   (c) allowing the shadow of the 3D virtual object to be displayed by at least one of the wall display device and a floor display device which corresponds to the wall display device by referring to the determined location and the determined shape of the shadow of the 3D virtual object,
   wherein the information on the viewpoint of the user is specified by a location and a direction of a screen camera corresponding to the viewpoint of the user and the location and the shape of the shadow of the 3D virtual object to be displayed is realized by a location and a rotation of a virtual floor camera depending on the location and the direction of the screen camera,
   wherein $$x\ floorCam = (x\ screenCenter - x\ screenCam)\frac{a}{d} + x\ screencam$$

$$yfloorCam = \frac{\frac{projectHeight}{2}}{\sin\left(\frac{fovFloorCam}{2}\right)}$$

$$z\ floorCam = (z\ screenCenter - z\ screenCam)\frac{a}{d} + z\ screencam$$

$$rotationfloorCam = \sin^{-1}\left(\frac{z\ screenCenter - z\ screenCam}{x\ screenCenter - x\ screenCam}\right)$$

$$a = d - \frac{projectHeight}{2}$$

$$d = \frac{y\ screenCam}{\sin\left(\frac{fovScreencam}{2}\right)}$$

$$x\ screenCenter = (x\ lookAt - x\ screenCam)d + x\ screencam$$

$$z\ screenCenter = (z\ lookAt - z\ screenCam)d + z\ screencam$$

when x floorCam, y floorCam, z floorCam, and rotation floorCam indicate coordinates of x, y, and z, and rotation angle of the virtual floor camera, respectively; x ScreenCam, y ScreenCam, and z ScreenCam point to coordinates x, y, and z of the screen camera, respectively; x ScreenCenter, y ScreenCenter, and z ScreenCenter indicate coordinates x, y, and z of the center of the display surface of the wall display device, respectively; projectHeight means the height of the display surface of the floor display device while fovFloorCam points out a field of view of the virtual floor camera and fovScreenCam a field of view of the screen camera.

8. A system for displaying a shadow of a 3D virtual object, comprising;
   a screen camera whose location and direction corresponding to a viewpoint of a user are provided to thereby allow a user viewpoint information acquiring part to acquire information on the viewpoint of the user looking at the 3D virtual object displayed in a specific location in 3D space by a wall display device;

a virtual floor camera whose location and rotation are provided to thereby allow a shadow location and shape determining part to determine a location and a shape of the shadow of the 3D virtual object to be displayed by referring to relation between the location and the rotation of the screen camera that specifies the location and the direction of the viewpoint of the user looking at the 3D virtual object and those of the virtual floor camera; and a shadow displaying part for allowing the shadow of the 3D virtual object to be displayed by at least one of the wall display device and a floor display device which corresponds to the wall display device by referring to the determined location and the determined shape of the shadow of the 3D virtual object to be displayed, wherein (1) if at least part of the shadow of the 3D virtual object is determined to be located near the user based on a boundary line between a display surface of the wall display device and a display surface of the floor display device, the at least part of the shadow of the 3D virtual object is allowed to be displayed through the floor display device, and (2) if at least part of the shadow of the 3D virtual object is determined to be located far from the user based on the boundary line therebetween, the at least part of the shadow of the 3D virtual object is allowed to be displayed through the wall display device.

9. The system of claim 8, wherein the shadow of the 3D virtual object includes a shadow generable on assumption that a light source is located on the upper side of the 3D virtual object in a direction vertical to a display surface of the floor display device.

10. The system of claim 8, wherein the wall display device includes a flat panel display device and the floor display device includes a projector display device.

11. The system of claim 8, wherein the screen camera is installed on the head of the user in a direction of the line of sight of the user.

12. The system of claim 8, wherein the shadow location and shape determining part determines the location and the shape of the shadow of the 3D virtual object to be displayed by further referring to information on a strength or a location of a real light source in the 3D space.

13. A system for displaying a shadow of a 3D virtual object, comprising;

a user viewpoint information acquiring part for acquiring information on a viewpoint of a user looking at the 3D virtual object displayed in a specific location in 3D space by a wall display device;

a shadow location and shape determining part for determining a location and a shape of the shadow of the 3D virtual object to be displayed by referring to the information on the viewpoint of the user and the information on a shape of the 3D virtual object; and a shadow displaying part for allowing the shadow of the 3D virtual object to be displayed by at least one of the wall display device and a floor display device which corresponds to the wall display device by referring to the determined location and the determined shape of the shadow of the 3D virtual object to be displayed, wherein the information on the viewpoint of the user is specified by a location and a direction of a screen camera corresponding to the viewpoint of the user and the location and the shape of the shadow of the 3D virtual object to be displayed is realized by a location and a rotation of a virtual floor camera depending on the location and the direction of the screen camera, wherein $$x\ floorCam = (x\ screenCenter - x\ screenCam)\frac{a}{d} + x\ screencam$$

$$yfloorcam = \frac{\frac{projectHeight}{2}}{\sin\left(\frac{fovFloorCam}{2}\right)}$$

$$z\ floorCam = (z\ screenCenter - z\ screenCam)\frac{a}{d} + z\ screencam$$

$$rotationfloorCam = \sin^{-1}\left(\frac{z\ screenCenter - z\ screenCam}{x\ screenCenter - x\ screenCam}\right)$$

$$a = d - \frac{projectHeight}{2}$$

$$d = \frac{y\ screenCam}{\sin\left(\frac{fovScreencam}{2}\right)}$$

$$x\ screenCenter = (x\ lookAt - x\ screenCam)d + x\ screencam$$

$$z\ screenCenter = (z\ lookAt - z\ screenCam)d + z\ screencam$$

when x floorCam, y floorCam, z floorCam, and rotation floorCam indicate coordinates x, y, z and rotation angle of the virtual floor camera, respectively; x ScreenCam, y ScreenCam, and z ScreenCam points to coordinates x, y, and z of the screen camera, respectively; x ScreenCenter, y ScreenCenter, and z ScreenCenter refer to coordinates x, y, and z of the center of the display surface of the wall display device, respectively; projectHeight, fovFloorCam, and fovScreenCam point to a height of the display surface of the floor display device, a field of view of the virtual floor camera, and a field of view of the screen camera, respectively.

* * * * *